United States Patent [19]

Jenkins

[11] 4,041,194
[45] Aug. 9, 1977

[54] DECORATIVE COATING COMPOSITION FOR COATING GLASSWARE

[75] Inventor: Kennedy A. Jenkins, Washington, Pa.

[73] Assignee: Hercules Incorporated, Wilmington, Del.

[21] Appl. No.: 617,608

[22] Filed: Sept. 29, 1975

[51] Int. Cl.$^2$ .................... C03C 17/32; B05D 3/00
[52] U.S. Cl. .................... 427/226; 106/29; 260/28.5 A; 260/33.4 R; 260/33.4 PQ; 260/42.43; 260/33.2 R; 427/197; 427/269; 427/385 A; 427/416; 428/35; 428/204; 428/441
[58] Field of Search .................... 260/28.5 A, 33.4 R, 260/33.4 PQ, 42.43, 33.2 R; 427/226, 269, 279, 416, 197, 385 A; 428/35, 204, 441; 106/27, 29, 30

[56] References Cited
U.S. PATENT DOCUMENTS

| | | | |
|---|---|---|---|
| 2,772,182 | 11/1956 | Jessen | 427/279 |
| 3,089,782 | 5/1963 | Bush et al. | 427/269 |
| 3,468,835 | 9/1969 | Dereich | 260/33.4 R |
| 3,859,242 | 1/1975 | Jenkins | 260/32.6 R |
| 3,937,854 | 2/1976 | Shank | 427/269 |

Primary Examiner—Ralph S. Kendall
Assistant Examiner—John D. Smith
Attorney, Agent, or Firm—Hazel L. Deming

[57] ABSTRACT

Hot melt decorative coating compositions for glassware are described. The coating compositions contain 50 to 80% of non-vitrifiable filler which preferably contains at least one pigment intimately dispersed in 50 to 20% of water-insoluble vehicle having a melt softening point range from 45° to 65° C. The vehicle contains as essential ingredients from 5 to 75% of at least one normally solid $C_{14-32}$ alcohol and 7 to 55% of certain polystyrenes and can also contain, if desired, up to 55% of paraffin wax, up to 40% of certain polyalkylene glycols, and up to 20% of specific lower alkyl acrylate polymers.

9 Claims, No Drawings

DECORATIVE COATING COMPOSITION FOR COATING GLASSWARE

This invention relates to decorative coating compositions and particularly to decorative coating compositions for application to glassware which is thereafter top-coated with plastic films. The invention also relates to a process for forming decorated, plastic coated glassware and to the articles so formed.

Enamel or ceramic coatings or glazes for glassware are well known. Such coatings or glazes are conventionally produced by applying a mixture of a thermofluid vehicle and enamel or ceramic color constituents to the object to be decorated and then firing the object to volatilize the vehicle and fuse the color to the object. Decorative coatings applied by firing techniques are firmly bonded to the substrate and have excellent durability.

Lightweight glassware and particularly bottles which are of low cost and hence suitable for one time use are also known. Bottles of this type, the so-called disposable bottles, like their heavier counterparts, are usually coated or decorated for identification purposes. The use of enamel or ceramic type coatings on disposable bottles, however, is not economically feasible. Attempts to offset bottle and decoration costs by means of an increase in bottle size and hence product capacity have also not been successful. The chief disadvantage of large size bottles is fragility, which imposes safety limitations on size and end use, and particularly on uses which include the packaging and storing of carbonated beverages. Thus, there is a finite size limitation on disposable beverage bottles.

One approach to overcome the size limitation of disposable bottles involves coating the bottle with a continuous plastic film. The film coating is said to toughen and strengthen the bottle and, although the coating does not prevent breakage, it has been found to act as a bag to contain and thus prevent scatter of glass fragments at breakage points. Film coatings which are transparent also provide see-through advantages and usually are not apparent until touched. The coatings further reduce noise level on the bottle handling line and reduce slip during handling so that carrying and pouring are more secure. Decoration of the bottle, either before or after coating with the film, however, is still required for identification purposes.

A decorative coating composition which does not require firing for application to glass articles and which can be topcoated with film-forming thermoplastics is described by Jenkins in U.S. Pat. No. 3,859,242 (Jan. 7, 1975). The coating of the Jenkins patent is of the hot melt type and contains a major amount of pigment-filler in a vehicle mixture of polyethylene glycols of different molecular weight ranges and a small amount of certain amine or ketone modifiers for the polyethylene glycols. Although Jenkins' coatings provide clear, sharp decorations which are inert to and completely visible through the top coating film, the decorations are highly moisture sensitive due to the watersoluble nature of the polyethylene glycol vehicle. Durability requirements of the bottle industry thus necessitate the inclusion of additional controls in conventional coating procedures to provide a waterproof top coating system which will have reasonable resistance to accidental damage during normal processing, handling and use conditions. Hence, the economic advantages usually attendant upon high speed processing with automated equipment cannot be fully realized with Jenkins' decorative coating.

Now, in accordance with this invention, there is provided a water-insensitive decorative coating composition which can be applied to glassware without firing, which gives thereon clear, sharp, bright decorative images that are sag and mar resistant and which can be top-coated with film-forming plastics conventionally without detriment to the decoration. Additionally, the decorative coatings formed from the compositions of this invention are sufficiently adherent to glass surfaces to permit normal processing with automated equipment, are inert and nonexuding, and do not adversely affect the protective properties of polymeric films applied thereover. Further, plastic coated glassware which has been decorated in accordance with this invention exhibit excellent clarity and brightness of the decoration and the safety feature of the "plastic bag effect" of the top coating is maximized.

Accordingly, the present invention relates to a thermofluid decorative coating composition consisting essentially of by weight (a) 20 to 50% of an essentially water-soluble vehicle having a melt softening point range from about 45° C. to about 65° C. and (b) 80 to 50% of a particulate, non-vitrifiable filler material intimately dispersed in said vehicle, said vehicle consisting essentially of by weight 5 to 75% of at least one normally solid, saturated aliphatic monohydric alcohol having 14 to 32 carbon atoms, 0 to 55% of paraffin wax, 0 to 40% of one or more polyalkylene glycols having an average molecular weight ranging from about 1500 to about 20,000 in which the alkylene groups have 2 to 3 carbon atoms, 7 to 55% of at least one polystyrene having an average molecular weight ranging from about 200 to about 1200 and a softening point below 105° C., and 0 to 20% of one or more lower alkyl acrylate polymers having an inherent viscosity between about 0.2 and about 0.7, the sum of said alcohol, wax and polyalkylene glycol components being 45 to 77% of the vehicle and the sum of said polystyrene and acrylate polymer components being 23 to 55% of the vehicle.

The invention also relates to a process for forming decorated glassware top-coated with a thermoplastic, film-forming polymer comprising the steps of applying to at least a portion of the outer surface of the glassware at least one layer of the above decorative coating composition, heating the decorated glassware to a temperature at least as high as the melting point of the film-forming polymer but below the annealing temperature of the glassware for sufficient time to remove any volatile components of the coating composition and thereafter applying at least one continuous top coating of the thermoplastic film-forming polymer to the decorated glassware. The invention further relates to an article comprising glassware having intimately associated with its outer surface at least one continuous coating of thermoplastic film-forming polymer and, intermediate said coating and at least a portion of the outer surface of the glassware, at least one essentially water-insoluble decorative layer of particulate, nonvitrifiable filler material intimately dispersed in a resinous binder consisting essentially of by weight 25 to 100% of at least one polystyrene having an average molecular weight ranging from 200 to about 1200 and a softening point below 105° C., 0 to 75% of one or more alkyl acrylate polymers having an inherent viscosity between about 0.2 and about 0.7, and 0 to 45% of one or more polyalkylene glycols having an average molecular weight ranging from about 1500 to about 20,000 in which the alkylene groups have 2 to 3 carbon atoms, the ratio of filler to binder in said decorative layer being greater than 1.

As stated, the coating composition of the invention is essentially water insoluble and consists essentially of filler and a vehicle which contains as essential ingredients, based on the weight of the vehicle, from 5 to 75% of at least one normally solid $C_{14-32}$ alcohol and 7 to 55% of certain polystyrenes. The vehicle can also contain, if desired, paraffin wax, certain polyalkylene glycols or specific lower alkyl acrylate polymers. Any saturated aliphatic monohydric alcohol or mixture of alcohols which is solid at room temperature (25° C.) and has a chain length of 14 to 32 carbon atoms can be used in the practice of the invention. Alcohols of this type are usually wax-like solids at room temperature, have softening points below about 65° C. and are volatile at below the melting temperature of the film-forming polymer of the top coating. Preferred are the substantially straight chain alcohols having 14 to 22 carbon atoms such as myristyl alcohol, cetyl alcohol, stearyl alcohol, eicosyl alcohol and 1-docosanol. The alcohols can be single alcohols or mixtures thereof and can contain minor amounts of other alcohols provided they do not detract from the advantages of the invention. Mixtures of fatty alcohols are particularly useful in the invention and are exemplified by the commercially available products known as Adol 62, 63 or 64 (mixed fatty alcohols made and sold by Ashland Chemical Company and comprising $C_{16}$ to $C_{20}$ alcohols), the alcohols made and sold by Procter & Gamble under the trade designations CO1618, CO1697F, CO1895 and CO1897F; and the Arachidyl alcohols sold by Faller Products Co., Inc.

The alcohol, wax and polyalkylene glycol components of the vehicle function as a wax type solvent or solvent system for the resinous, binder type components of the vehicle and constitute 45 to 77% of the total weight of the vehicle. The solvent portion of the vehicle can consist entirely of the alcohol component or as is preferred for reasons of economy can contain by weight of the vehicle up to 55% of paraffin wax and/or up to 40% of certain polyalkylene glycol type waxes. When alcohols are the sole waxlike component of the vehicle, the amount should not exceed 75% of the vehicle. As is indicated above, the inclusion of up to 55%, and particularly from 15 to 50% by weight of paraffin wax in the vehicle is particularly preferred. In place of or in addition to the paraffin wax, the vehicle can also contain up to 40% of at least one polyalkylene glycol having an average molecular weight ranging from about 1500 to about 20,000 in which the alkylene groups have 2 to 3 carbon atoms. Preferred polyalkylene glycols are the polyethylene glycols having the recited molecular weights and available commercially as the Carbowax polyethylene glycols (Union Carbide Corp.) and as polyethylene glycols (Dow Chemical Co. and Matador Chemical Co.). The polyalkylene glycols are normally solid, wax-like polymers having melt softening points ranging from about 42° to about 64° C. Unlike the alcohol and paraffin wax components of the vehicle, they are not volatile below the annealing temperature of glass. Where present, the polyalkylene glycol component will preferably constitute from about 15 to about 40% of the vehicle. Particularly preferred are mixtures of polyethylene glycols wherein the major portion of the mixture is a polyethylene glycol having an average molecular weight of about 2500 to about 4500 and the minor portion of the mixture is a polyethylene glycol having an average molecular weight of about 10,000 to 20,000.

The vehicle, as stated, also contains 7 to 55% of certain low molecular weight polystyrenes and 0 to 20% of specific acrylate polymers. The polystyrene(s) and acrylate polymer(s) constitute 23 to 55% of the total vehicle weight and function as a resinous binder component which is soluble in the wax-like solvent portion of the vehicle.

The polystyrene component of the vehicle is at least one low molecular weight homopolymer of styrene having a molecular weight ranging from about 200 to about 1200 and a softening point less than 105° C. One or more than one of such polystyrenes can be used as the sole binder or the polystyrene(s) can be used in combination with up to 20% by weight of the vehicle of certain lower alkyl acrylate polymers. The preferred polystyrenes generally have softening points ranging from about 5° to about 75° C. and the most preferred polystyrenes are normally solid resins at room temperature. Suitable polystyrenes are commercially available as the Piccolastic A series resins of Hercules Incorporated and the Piccolastic resins designated as A25, A50 and A75 are particularly preferred.

The lower alkyl acrylate polymers which can form a part of the vehicle in accordance with the invention have an inherent viscosity between 0.2 and 0.7 (measured on a solution of 0.25 gram of polymer in 50 ml of chloroform at 25° C.). Lower alkyl acrylate polymers which have the recited inherent viscosities include the polymeric alkyl acrylates, and particularly the methacrylates, wherein the alkyl group contains 1 to 6 carbon atoms. Preferred are the homopolymers of methyl methacrylate, ethyl methacrylate, n-butyl methacrylate and isobutyl methacrylate, and copolymers of any of the above alkyl acrylates with each other. Particularly preferred are the normal butyl and isobutyl methacrylate polymers. Such polymers are available commercially as the Elvacites of E. I. duPont de Nemours & Co. and particularly Elvacite 2008, 2013, 2041, 2044 and 2045; and Neocryl B750 (Polyvinyl Chemical Industries).

The coating compositions of this invention also contain from 50 to 80% of particulate non-vitrifiable filler material. By filler material is meant any inert inorganic or organic solid or mixture of solids which can be finely-divided, usually to a particle size less than about 5 microns, is insoluble in the vehicle and is not vitrifiable. Typical fillers include silica, talc, gypsum, calcium carbonate, alumina, titanium dioxide, dolomite, aluminum silica, calcium silicate, sodium potassium aluminum silicate, and the like, as well as mixtures of any of the above or mixtures with colored inorganic or organic pigments. Typical pigments include lead chromate, iron oxide, zinc oxide, titanium dioxide, the cadmium yellows or reds, the copper phthalocyanines, the Diarylide Yellows, the Rubine Toners such as Aztec Red, and the like. Preferably, the filler will contain from about 1 to about 25% of at least one pigment. Other materials such as dyes can be present in the filler to provide a desired effect. The amount of filler in the coating, as stated, can range from 50 to 80%. Amounts above and below the range recited give compositions which sag, mar or do not print well on glass and thus are unsuitable for decorative purposes.

The coating compositions of the invention are of the hot melt or thermofluid type and can be prepared conventionally by mixing the vehicle components together at above the melting point of the components and dispersing the filler material therein while the vehicle is molten, using, for example, a Cowles disperser, a Groen mixer, a Morehouse mill, or similar mixing devices. The coating compositions can also be prepared by premixing the ingredients and passing the premix through a three-roll paint mill.

The coating compositions of this invention are particularly suited for decorative application to glass and similar substrates and particularly glass containers which are to be topcoated with a film-forming polymer. The decorative coating composition can be applied to the surface of a glass object conventionally, as through a screen stencil by means of a squeegee process, at a temperature above the melting point of the vehicle. If, as is usually the case, the surface of the glass is maintained at or near room temperature, the coating composition will set immediately and produce a mark-resistant, adherent design on the object. A plurality of coating compositions in any color, design or registry can be superimposed upon each other immediately, as by overprinting. The object with the decorative coating composition thereon can be immediately top-coated with a film-forming polymer or can be stored, as such, if desired, for future application of the top coating. Prior to application of the top coating, the decorated object is preferably heated to remove components of the vehicle which are volatile at below the melting point of the film-forming polymers. This is easily accomplished by a heating step wherein the temperature of the object is raised and maintained at or above the melting temperature of the polymer but below a temperature which causes a loss of annealing strength of the glassware. Usually, the decorated bottle will be heated at between about 135° and 230° C. for a sufficient period of time to permit volatilization of the alcohol component and any paraffin wax present thereon, usually from 5 to 45 minutes. Following heating of the coating, the object can be top-coated directly or cooled and then top-coated. In the case of bottles, uniform, thin film top coatings can be achieved using such basic coating techniques as the fluidized bed dip process, an electrostatic fluidized bed or an electrostatic spray gun. For dipping, the bottle should be heated so that a 2-3 seconds of contact with the fluidized particles during immersion results in contact fusion and pickup of sufficient powder to flow out to a 4 mils or greater film thickness. For both electrostatic processes, the powdered polymer is charged negatively and deposited by electrostatic attraction onto warmed bottles which are rotating slowly. Fusion of the powder is carried out conventionally as by tuned infrared heating, heating in a hot air oven, or the like, and the coating set to a solid state by cooling in air and/or water.

Suitable film-forming polymers include the high molecular weight thermoplastic resins such as the polyolefins, particularly polyethylene and polypropylene, the polyesters and particularly polyethylene terephthalate, the polyamides, polymers of vinyl chloride, copolymers of ethylene with acrylic esters and/or acrylic acids, and the like. Particularly preferred are the ionic polymers based on ethylene and containing carboxyl groups located along the polymer chain, as for example, the copolymers of ethylene and a small amount of sodium methacrylate and methacrylic acid. The ionic polymers are available under the Surlyn trademark (duPont).

The invention is further illustrated by reference to the following examples in which all parts and percentages are by weight unless otherwise specified.

EXAMPLE 1

A vehicle having a melt softening point of 48° C. was prepared by stirring at 95° C. until homogeneous 54 parts of a mixed fatty alcohol containing 24.3% of a $C_{16}$ alcohol, 68.6% of a $C_{18}$ alcohol and 7.1% of a $C_{20}$ alcohol (Adol 64), 23 parts of paraffin wax (4415 wax; melting point 63° C.), 5.8 parts of normal butyl methacrylate polymer having an inherent viscosity of 0.53 (Elvacite 2044), 5.8 parts of isobutyl methacrylate polymer having an inherent viscosity of 0.66 (Elvacite 2045) and 11.6 parts of a friable polystyrene having a molecular weight of 300–400, a softening point of 75° C. and a melt viscosity of 100 cps. at 150° C. (Piccolastic A75).

Twenty (20) parts of the above vehicle were mixed with 25 parts of potassium sodium aluminum silicate (Minex No. 7) and 4 parts of titanium dioxide at 110° C. to give a white color identified hereinafter as Color A.

Twenty parts of the above vehicle were mixed with 21 parts of Minex No. 7, 2 parts of Aztec Red toner and 0.75 part of titanium dioxide at 110° C. to give a red color identified hereinafter as Color B.

The white color A was heated to 88° C. and applied as a decorative coating on the shoulder and on the body of a 48 oz. size disposable-type glass bottle by metal screen printing. The white decoration on the bottle shoulder and body was overprinted in part with red color B applied at 75° C. by metal screen printing in a different design. The multicolor decoration in a red and white design was clear, sharp and substantially free of irregularities and screen marks.

The multicolor decorated bottle was then heated to 260° C. for 20 minutes, cooled and thereafter top-coated, as follows, with a film of a high molecular weight ionic copolymer of ethylene containing a small amount of sodium methacrylate and methacrylic acid and having a melt flow index (ASTM D1238-627) of about 20 dg./min. (Surlyn AD 5001). The top coating was applied by preheating the decorated bottle to 205° C. and immersing the preheated bottle in a fluidized bed of 10 to 80 micron particles of the ionic copolymer, following which the coating was fused at 205° C. The coated bottle was then cooled first in air and then in water. The top coating was a transparent film which covered all of the bottle surfaces up to the finish of the bottle. The decoration was completely visible through the top coating and was as clear and sharp as a decoration which had not been top-coated. After storage of the bottle for 3 weeks, there was no evidence of color bleed through into the top coating or deterioration of the decoration or the top coating. When parallel knife cuts one inch apart were made on the top-coated surface of the bottle, a film of Surlyn having the decoration adhered to its underside was easily peeled from the bottle surface by hand. The white and red multicolor decorative layer on the film analyzed 85% of filler-pigment, 7.5% of butyl methacrylate polymers and 7.5% of polystyrene.

EXAMPLES 2 to 5

Various red and white color compositions were prepared according to the procedure of Example 1 except that the type and the amount of the components of the vehicle and the vehicle:filler ratio were varied as shown in the table below. The decoration on the plastic coated bottle was completely visible through the top coating and was as clear and sharp as a decoration which had not been top-coated.

When the decorated, plastic coated bottles of these examples were filled with carbonated water and dropped on their sides a distance of 4 feet onto a concrete floor, the internal glass bottles were broken into many pieces which scattered over an area having a diameter of not more than 3 feet. When a plastic coated control bottle was prepared and tested in the same manner except that the decorative coating was omitted, the glass bottle was broken into many pieces which scattered over the same area. Comparison of the results of the drop test indicates that the decoration did not adversely affect the film strength of the plastic top coating.

Table

| Example No. | 2 | 3 | 4 | 5 |
|---|---|---|---|---|
| Vehicle (parts) | | | | |
| Adol 62[1] | 74 | 52 | — | — |
| CO1897F[2] | — | — | — | 6 |
| CO1618[3] | — | — | 16.7 | — |
| 4415 wax | — | 22 | — | — |
| 1413 wax[4] | — | — | 50 | — |
| Carbowax 4000[5] | — | — | — | 33 |
| Carbowax 20M[6] | — | — | — | 6 |
| Elvacite 2044 | 2 | 9.3 | 8.3 | — |
| Elvacite 2045 | 2 | 9.3 | 8.3 | — |
| Piccolastic A75 | 22 | — | — | 51 |
| Piccolastic A5[7] | — | 7.4 | 16.7 | — |
| Piccolastic A25[8] | — | — | — | 4 |
| Vehicle Softening Point (° C.) | 56.5 | 52 | 47.5 | 42 |
| White Color A (parts) | | | | |
| Vehicle | 10 | 10 | 10 | 5 |
| Minex 7 | 25.8 | 21.5 | 30.2 | 5.6 |
| TiO$_2$ | 4.2 | 3.5 | 4.8 | 0.9 |
| Melt Viscosity of Colors A at 93.5° C. ranged from 36,000 to 46,000 cps. | | | | |
| Red Color B (parts) | | | | |
| Vehicle | 10 | 10 | 10 | 5 |
| Minex 7 | 17.7 | 15.9 | 22.1 | 5.3 |
| TiO$_2$ | 0.6 | 0.6 | 0.8 | 0.2 |
| Aztec Red | 1.7 | 1.5 | 2.1 | 0.5 |
| Melt Viscosity of Colors B at 93.5° C. ranged from 20,000 to 30,000 cps. | | | | |
| Composition of decorative layer (%)[9] | | | | |
| Filler-pigment | 91 | 89 | 90 | 56 |
| Butyl methacrylate polymer | 1 | 8 | 5 | — |
| Polystyrene | 8 | 3 | 5 | 30 |
| Polyethylene glycols | — | — | — | 14 |

Footnotes for Table
[1] Adol 62 is a mixed fatty alcohol containing 1% C$_{14}$, 4% C$_{16}$, 93% C$_{18}$ and 2% C$_{20}$ alcohols.
[2] CO1897F is a mixed fatty alcohol containing 2.5% C$_{16}$ and 97.5% C$_{18}$ alcohols.
[3] CO1618 is a mixed fatty alcohol containing 1.5% C$_{12}$, 4% C$_{14}$, 29.5% C$_{16}$ and 65% C$_{18}$ alcohols.
[4] 1413 wax is a paraffin wax having a melting point of 55° C.
[5] Carbowax 4000 is a polyethylene glycol having a molecular weight of about 3000 to about 3700 and a viscosity of 80–95 centistokes at 99° C.
[6] Carbowax 20M is a polyethylene glycol having an approximate molecular weight of 15,000 and a viscosity of 96,000 cps. at 99° C.
[7] Piccolastic A5 is a liquid polystyrene having a molecular weight of 300–400, a softening point of 5° C. and a melt viscosity of 100 cps. at 70° C.
[8] Piccolastic A25 is a viscous liquid polystyrene having a molecular weight of 300–400, a softening point of 25° C. and a melt viscosity of 100 cps. at 80° C.
[9] Determination made on sample of white color following heating at 205° C. for 30 minutes.

What I claim and desire to protect by Letters Patent is:

1. A thermofluid decorative coating composition consisting essentially of by weight
   a. 20 to 50% of an essentially water-insoluble vehicle having a melt softening point range from about 45° to about 65° C. and
   b. 80 to 50% of a particulate, non-vitrifiable filler material intimately dispersed in said vehicle,
   said vehicle consisting essentially of by weight from 5 to 75% of at least one normally solid saturated aliphatic monohydric alcohol having 14 to 32 carbon atoms, 0 to 55% of paraffin wax, 0 to 40% of one or more polyalkylene glycols having an average molecular weight ranging from about 1500 to 20,000 in which the alkylene groups have 2 to 3 carbon atoms, 7 to 55% of at least one polystyrene having an average molecular weight ranging from about 200 to about 1200 and a softening point below 105° C., and 0 to 20% of one or more lower alkyl acrylate polymers having an inherent viscosity between about 0.2 and about 0.7, the sum of said alcohol, wax and polyalkylene glycol components being 45 to 77% of the vehicle and the sum of said polystyrene and acrylate polymer components being 23 to 55% of the vehicle.

2. The coating composition of claim 1 wherein said alcohol is a mixed fatty alcohol containing C$_{16}$ to C$_{20}$ alcohols.

3. The coating composition of claim 2 wherein said lower alkyl acrylate polymer is a mixture of equal parts poly(n-butyl methacrylate) and poly(isobutyl methacrylate).

4. The coating composition of claim 3 wherein said filler material contains from about 5 to about 25% based on the weight of the filler material of at least one pigment.

5. The coating composition of claim 4 wherein the polystyrene has a molecular weight of about 300 to about 400 and a softening point between about 5° and about 75° C.

6. The coating composition of claim 5 wherein said vehicle contains 15 to 50% of paraffin wax.

7. The coating composition of claim 2 wherein the polystyrene has a molecular weight of about 300 to about 400 and a softening point between about 5° and about 75° C. and the vehicle contains 15 to 40% of said polyalkylene glycol.

8. The coating composition of claim 7 wherein said polyalkylene glycol is polyethylene glycol.

9. A process for forming decorated glassware top-coated with a thermoplastic film-forming polymer comprising the steps of applying to at least a portion of the outer surface of the glassware at least one layer of the decorative coating composition of claim 1, heating the decorated glassware to a temperature at least as high as the melting point of the polymer but below the annealing temperature of the glassware for sufficient time to remove any volatile components of the coating composition, and thereafter applying at least one continuous top coating of the thermoplastic film-forming polymer to the decorated glassware.

* * * * *

UNITED STATES PATENT AND TRADEMARK OFFICE
CERTIFICATE OF CORRECTION

PATENT NO. : 4,041,194
DATED : August 9, 1977
INVENTOR(S) : Kennedy A. Jenkins

It is certified that error appears in the above-identified patent and that said Letters Patent are hereby corrected as shown below:

Col. 2, Line 23
 "water-soluble"  -- sould read -- "water-insoluble"

Signed and Sealed this

Fifteenth Day of November 1977

[SEAL]

Attest:

RUTH C. MASON
*Attesting Officer*

LUTRELLE F. PARKER
*Acting Commissioner of Patents and Trademarks*